US 6,668,010 B1

(12) United States Patent
Minematsu

(10) Patent No.: US 6,668,010 B1
(45) Date of Patent: Dec. 23, 2003

(54) PN CODE GENERATION APPARATUS AND METHOD, AND RADIO COMMUNICATION APPARATUS

(75) Inventor: Toru Minematsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/288,980

(22) Filed: Apr. 9, 1999

(30) Foreign Application Priority Data

Apr. 13, 1998 (JP) .......................................... P10-101569

(51) Int. Cl.[7] .......................... H03H 17/00; H04B 7/216

(52) U.S. Cl. ...................... 375/145; 375/230; 370/375; 370/479

(58) Field of Search ................................ 375/133, 145, 375/206, 208, 230; 370/18, 479

(56) References Cited

U.S. PATENT DOCUMENTS

| 4,365,338 A | * | 12/1982 | McRae et al. ............... 375/230 |
| 5,570,349 A | * | 10/1996 | Bustamante et al. ........ 370/335 |
| 5,596,571 A | * | 1/1997 | Gould et al. ................. 370/335 |
| 5,659,569 A | * | 8/1997 | Padovani et al. ........... 370/479 |

* cited by examiner

Primary Examiner—Stephen Chin
Assistant Examiner—Edith Yeh
(74) Attorney, Agent, or Firm—Jay H. Maioli

(57) ABSTRACT

A PN code generation method of generating a pseudo random noise (PN) code sequence of n cycle (n is an integral number more than 1) having the synchronization relation with a transmission frame of m cycle (m is an integral number more than 1) and is not in, starts generating the PN code sequence keeping the synchronization relation with the transmission frame at start timing of a specific frame in response to identification information and start timing information of the specific frame out of a plurality of transmission frames.

3 Claims, 9 Drawing Sheets

FIG. 3
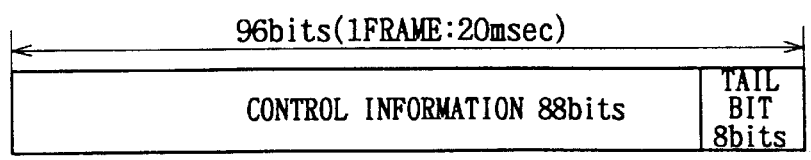
FIG. 4A 9600bps
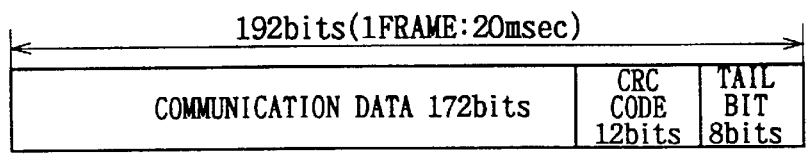
FIG. 4B 4800bps
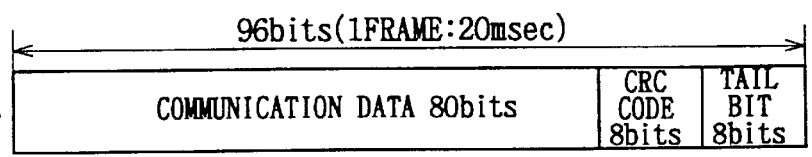
FIG. 4C 2400bps
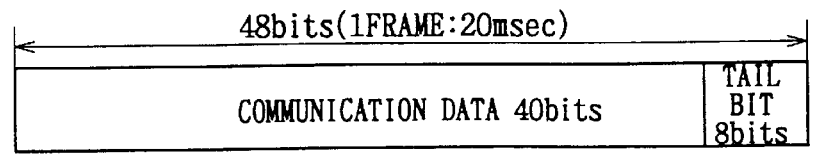
FIG. 4D 1200bps
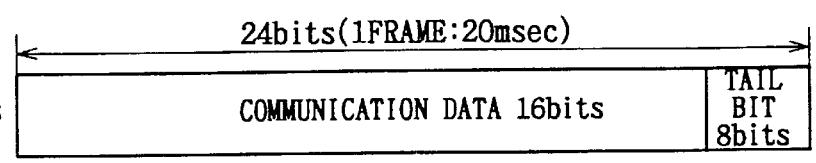

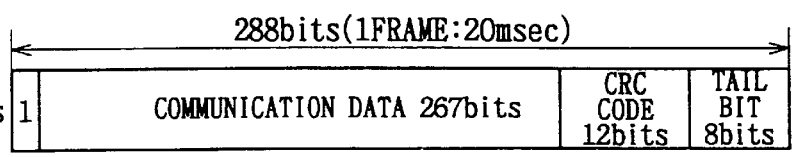
FIG. 5A 14400bps
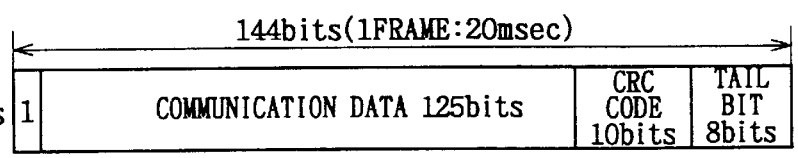
FIG. 5B 7200bps
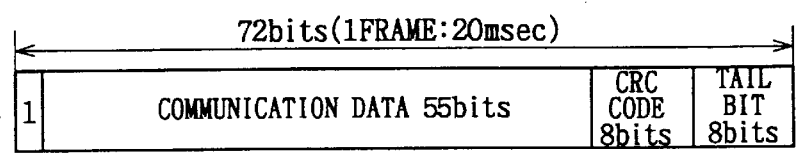
FIG. 5C 3600bps
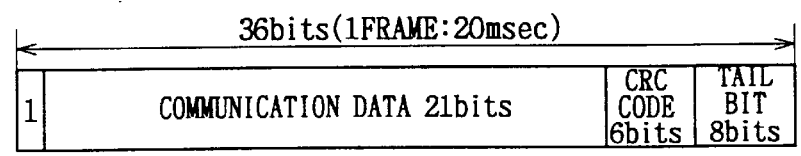
FIG. 5D 1800bps

PN CODE GENERATION APPARATUS AND METHOD, AND RADIO COMMUNICATION APPARATUS

BACKGROUND OF THE INVENTION

1. Field of the Invention

This invention relates to a PN code generation apparatus and method, and a radio communication apparatus, and more particularly, is suitably applied to a cellular radio communications system according to the code division multiple access (CDMA) system.

2. Description of the Related Art

In the cellular radio communications system, an area for offering the communication service is divided into cells with the desired sizes and a base station as the fixed radio station is provided in each cell and a portable telephone as a mobile radio station is connected by radio to the base station having the optimal communication condition.

In this CDMA system which is one of the mobile communication systems, the transmitting side allocates specific pseudo-random noise (PN) sequence code formed of pseudo-random noise sequence code to each communication circuit with the same carrier frequency and by multiplying the primary modulation wave by the PN code, spreads this to wider band than the original frequency band (hereinafter referred to as spread spectrum) and transmits the secondary modulation wave supplied the spread-spectrum processing.

The mobile station of cellular radio communications system according to the CDMA system receives a pilot PN code transmitted through the pilot channel out of the forward link channels from the base station, and by trapping the timing (phase) of the pilot PN code, can generate the PN codes in the mobile station synchronized with the PN code to be used in the base station side.

The mobile station transmits its own position information or various kinds of information such as calls from/to its own station, to the base station through the access channel out of the rivers link channels. During conversation, a transmission symbol sequence is formed by compression-coding the communication data, such as audio information, for each frame. The transmission symbol is modulated, subjected to the spread-spectrum processing using the same PN code as that used in the base station, and is transmitted through the traffic channel out of the reverse link channels.

In the cellular radio communications system according to the CDMA system, in order to synchronize times among all base stations, each base station sets the absolute reference time using the global positioning system (GPS) wave according to the IS-95 standard and thus, time synchronization among base stations is obtained.

In this case, each base station. transmits the same long code PN code, as the spread code based on the absolute reference time at different timing for each base station to base station, and thus, by trapping only the reception timing (phase) of the long code PN code, the mobile station can search the base station to be connected and simultaneously can obtain the system time synchronized with the absolute reference time.

With this arrangement, the mobile station forms pilot PN code synchronized with the system time of the base station with the pilot PN code generator to be described later, and multiplying the transmission symbol sequence by this, applies the spread-spectrum processing. At this point, in the mobile station, in the case of multiplying transmission symbol sequence by the pilot PN code, it is necessary that the timing of the start time of the transmission frame (the border between transmission frames) coincides with the timing of the pilot PN code generation.

As shown in FIG. 1, in the mobile station, mark per 2-second of the system time obtained by synchronizing with the connecting base station and the start time of the transmission frame (the border between the transmission frame of the frame number 0 and the transmission frame of the frame number 3) are in agreement. This is regulated in the IS-95. Moreover, since the pilot PN code, which is generated by the pilot PN code generator, is the 15th-order PN code and it has the chip rate of 1.2288 Mbps, and its cycle is 26.66 . . . msec ($2^{15}/122880$ sec).

With this arrangement, three cycles of the pilot PN code (26.66 . . . msec×3) and one cycle of the super frame (80 msec) formed of four frames of transmission frame are in agreement. Since one cycle of the pilot PN code is 26.66 msec, it repeats 75 cycles (2/0.02666) by the time the next mark per 2 second appears.

As shown in FIG. 2, in the conventional pilot PN code generator 1 for generating these pilot PN codes, the reference clock CLK synchronized with the absolute reference time is supplied and also timing information for each the start time point of the super frame SFRM is supplied. And the pilot PN code generator 1 generates the 15th-order pilot PN code based on the reference clock CLK and the timing information SFRM.

In practice, the pilot PN code generator 1 loads an initial value $S_{INIT}$ memorized in the internal memory 2 in advance, based on the timing information SFRM synchronized with the reference clock CLK, and based on the initial value $S_{INIT}$, initializes the whole pilot PN code generator 1 only at each start time of the super frame or at the operation start time.

Accordingly, since the pilot PN code generator 1 is initialized based on the initial value $S_{INIT}$, the mobile station is able to conduct the spread-spectrum processing by generating pilot PN codes from the head of the code sequence pattern at the timing of the super frame.

Accordingly, even in the case where the control information was received from the base station and response information should be transmitted before the start time of the frame number 2 of the super frame, since the mobile station could not obtain the initial value $S_{INIT}$ until the next super frame timing, the mobile station could not transmit the response information. More specifically, the mobile station could not generate pilot PN codes which is synchronized with the super frame, to be multiplied by the transmission symbol sequence at the start point timing of the frame number 2, and it caused a problem that the waiting time became 80 msec at the longest and the response information could not be transmitted in time.

SUMMARY OF THE INVENTION

In view of the foregoing, an object of this invention is to provide a PN code generation apparatus and method, and a radio communication apparatus which can generate PN codes synchronized with a super frame at the start timing of an arbitrary transmission frame from the head of code sequence pattern.

The foregoing object and other objects of the invention have been achieved by the provision of a radio communication apparatus for generating a transmission signal subjected to the spread spectrum by multiplying a PN code sequence by transmission data, in which a control means controls timing of sequentially generating a plurality of transmission frames as transmission data, and a PN code generating means generates a PN code sequence having n cycles (n is an integral number more than 1 and is not m) which has a synchronization relation with the transmission frame of m cycle (m is an integral number more than 1). In the case of transmitting a response signal to a receive signal, the control means supplies identification information and start timing information of a specific frame out of the plurality of transmission frames, and the PN code generating means starts generating the PN code sequence keeping the synchronization relation with the transmission frame at the start timing of the specific frame in response to the identification information and the start timing information of the specific frame.

The nature, principle and utility of the invention will become more apparent following detailed description when read in conjunction with the accompanying drawings in which like parts are designated by like reference numerals or characters.

BRIEF DESCRIPTION OF THE DRAWINGS

In the accompanying drawings:

FIG. 3 is a brief linear diagram showing the frame format in the access channel according to an embodiment of the present invention;

FIGS. 4A to 4D are brief linear diagrams showing frame formats in the rate set 1 of the traffic channel according to an embodiment of the present invention;

FIGS. 5A to 5D are brief linear diagrams showing frame formats in the rate set 2 of the traffic channel according to an embodiment of the present invention;

DETAILED DESCRIPTION OF THE EMBODIMENT

Figure 1:
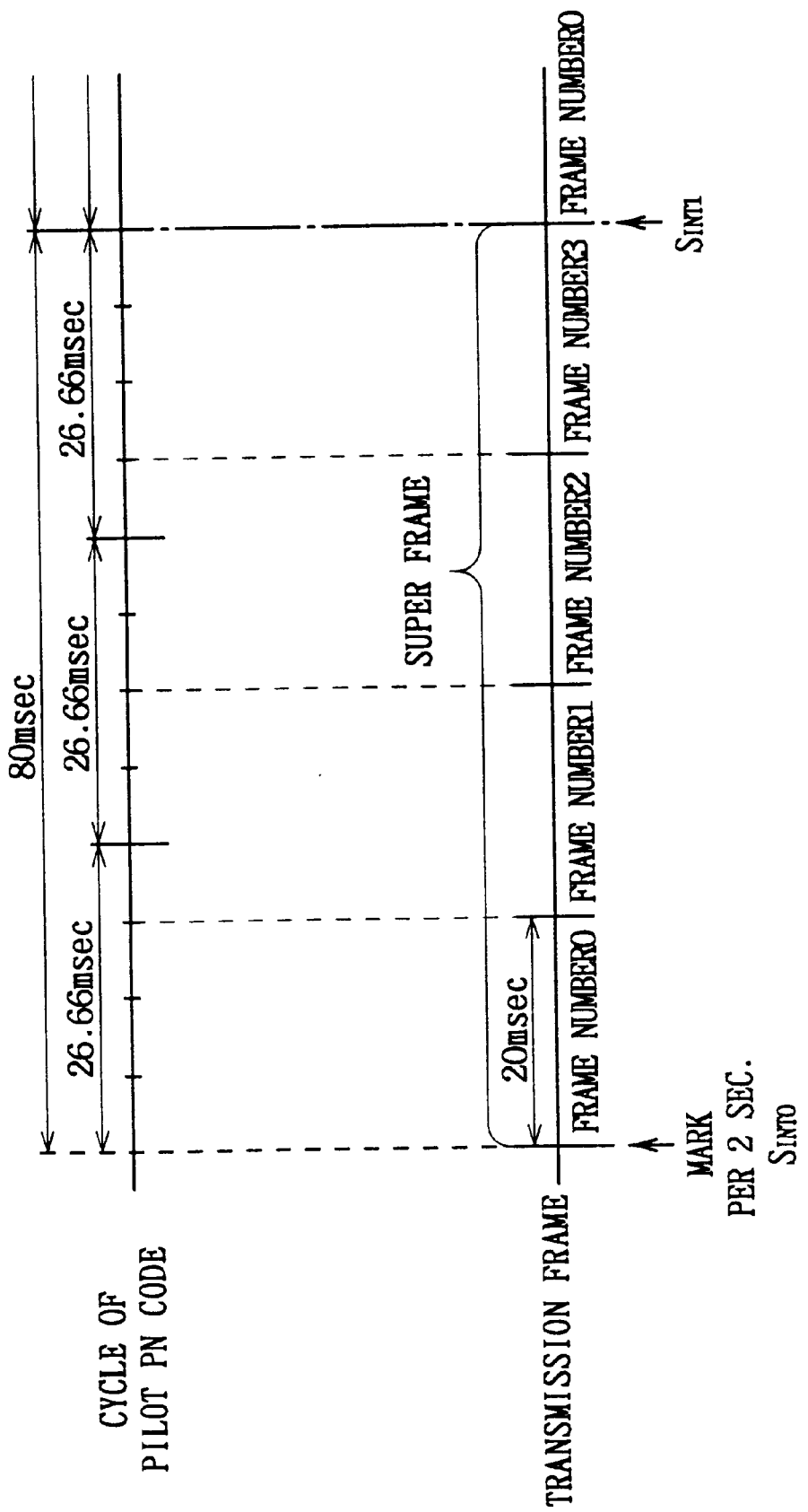
FIG. 1 is a timing chart showing the conventional initialization timing.
Figure 2:
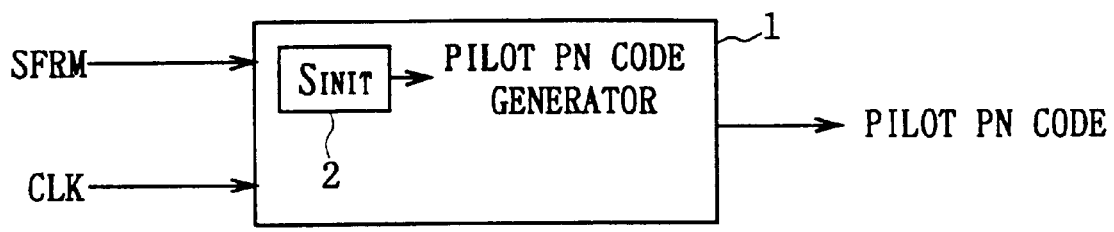
FIG. 2 is a block diagram showing the conventional pilot PN code generator.

Preferred embodiments of this invention will be described with reference to the accompanying drawings:

(1) Frame Format

In the present invention, a transmission frame format in the access channel and-the traffic channel out of reverse link channels for transmitting from the mobile station to the base station will be described.

As shown in FIG. 3, regarding the transmission frame of the access channel (hereinafter referred to as access channel (AC) frame), one frame (20 msec) consists of 88 bits control information and 8 bits tail bits; i.e., 96 bits in total.

Moreover, regarding the transmission frame of the traffic channel (hereinafter referred to as traffic channel (TC) frame), two kinds of rate sets having different transmission rates, the rate set 1 and the rate set 2, are provided. As shown in FIGS. 4A to 4D, frame formats of the TC frame in the rate set 1 differ according to four kinds of transmission speeds. And in the case where the transmission speed is 9600 bps, one frame (20 msec) consists of communication data of 172 bits, CRC code of 12 bits and tail bit of 8 bits; i.e., 192 bits in total.

Furthermore, regarding the TC frame in the rate set 1, in the case where the transmission speed is 4800 bps, one frame (20 msec) consists of 96 bits; i.e., communication data of 80 bits, CRC codes of 8 bits and tail bits of 8 bits. And in the case where the transmission speed is 2400 bps, one frame (20 msec) consists of 48 bits in total, i.e., communication data of 40 bits and tail bits of 8 bits. In the case where the transmission speed is 1200 bps, one frame (20 msec) consists of 24 bits, i.e., communication data of 16 bits and tail bits of 8 bits.

On the other hand, regarding the TC frame in the rate set 2, as shown in FIGS. 5A to 5D, frame formats differ according to four kinds of transmission speeds. In the case where the transmission speed is 14400 bps, one frame (20 msec) consists of 288 bits, i.e., erasure indicator bit (EIB) data of one bit, communication data of 267 bits, CRC codes of 12 bits and tail bits of 8 bits. And in the case where the transmission speed is 7200 bps, one frame (20 msec) consists of 144 bits; i.e., EIB data of one bit, communication data of 125 bits, CRC codes of 10 bits and tail bits of 8 bits.

Moreover, regarding the TC frame in the rate set 2, in the case where the transmission speed is 3600 bps, 1 frame (20 msec) is formed of 72 bits; EIB data of one bit, communication data of 55 bits, CRC codes of 8 bits and tail bits of 8 bits. In the case where the transmission speed is 1800 bps, one, frame (20 msec) is formed of 36 bits; EIB data of one bit, communication data of 21 bits, CRC codes of 6 bits and tail bits,of 8 bits. Here, EIB data of one bits is data to be used for informing the reception of frame which becomes an error in the rate set 2 to the base station. And normally, it is "0" and is transmitted as "1" when the frame being an error is received.

(2) Transmission Processing of Transmission Unit in Mobile Station

Figure 6:
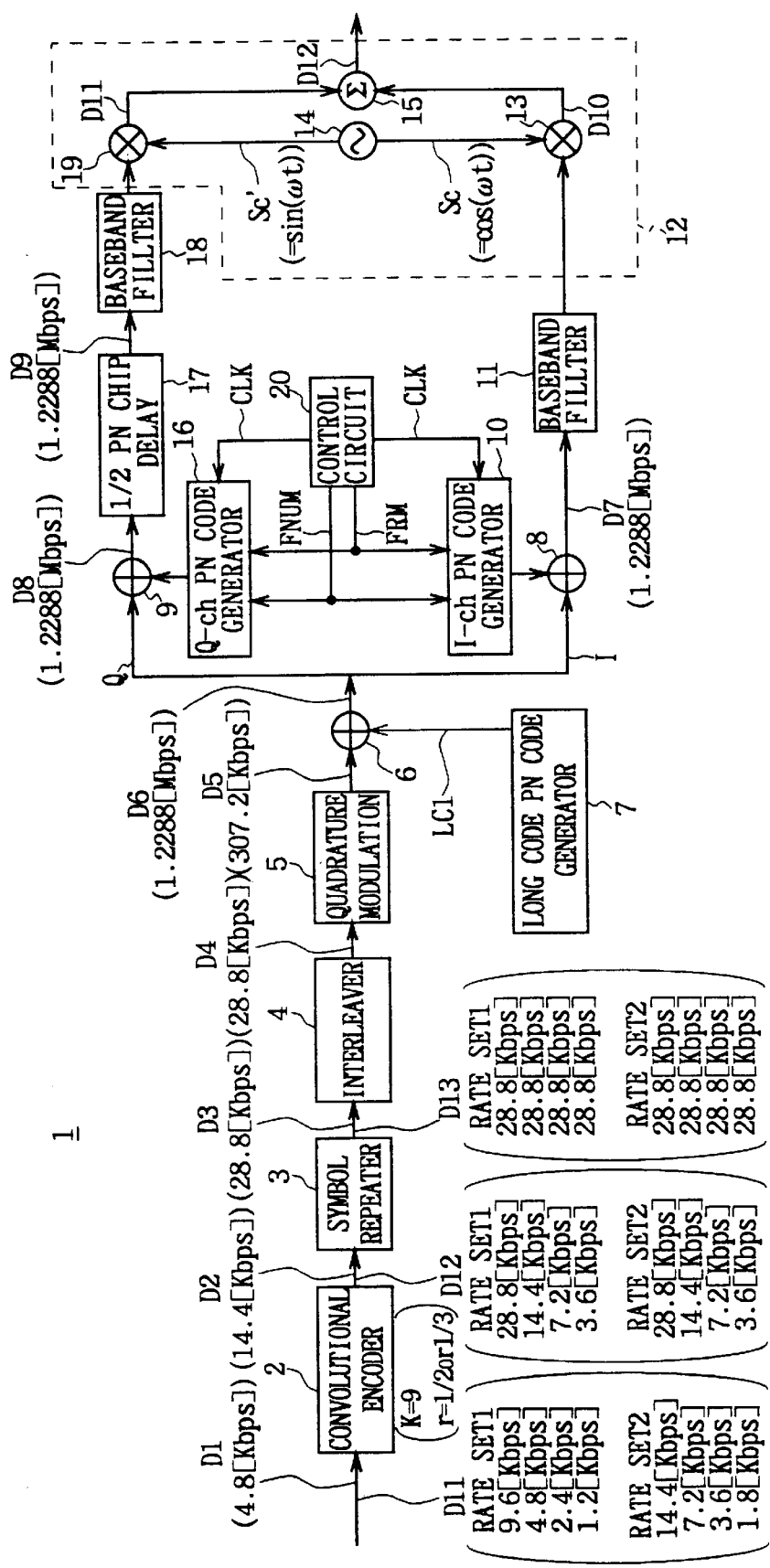
FIG. 6 is a block diagram showing the AC frame transmission processing in the access channel and the TC frame transmission processing in the traffic channel at the transmission unit according to an embodiment of the present invention.

A flow of the processing of the mobile station to transmit AC frame through the access channel and a flow of the processing to transmit TC frame through the traffic channel will be described. As shown in FIG. 6, in the transmission unit 1 of the mobile station, AC frame data D1 having the transmission speed of 4.8 Kbps is entered into a convolutional encoder 2.

The convolutional encoder 2 forms transmission symbol sequence data D2 of 14.4 Kbps by convolutional-encoding AC frame data D1 of 48 Kbps based on the preset restricting length (k=9) and the coding rate (r=1/3) and outputs this to a symbol repeater 3. The symbol repeater 3 forms transmission symbol sequence data D3 of 28.8 Kbps by repeating one symbol of transmission symbol sequence data D2 of 14.4 Kbps twice in succession (i.e., the same symbol continues twice), and transmits this to an interleaver 4.

The interleaver 4, after writing each symbol of the transmission symbol sequence data D3 in the internal memory (not shown in Fig.) according to the predetermined write-in order, applies the block interleave processing by reading this out in the order reverse to the write-in order, and transmits this as transmission symbol sequence data D4 of 28.8 Kbps to a quadrature modulator 5.

The quadrature modulator 5 converts the transmission symbol sequence data D4 to quadrature modulation data D5 of 307.2 Kbps by converting the transmission symbol sequence data D4 to a quadraturely related Walsh code and transmits this to the first exclusive OR circuit 6. The first exclusive OR circuit 6 forms spread data D6 by spreading the quadrature modulation data D5 utilizing long code PN code LC1 of 1.2288 Mbps, which is supplied from the long code PN code generator 7. In-phase components I of the spread data D6 is supplied to the second exclusive OR circuit 8, and quadrature components Q is supplied to the third exclusive OR circuit 9.

The second exclusive OR circuit 8 applies the spread-spectrum processing to in-phase components I by the 15th-order pilot PN code ("1" or "−1" as the data value) having 1.2288 Mbps, which is supplied from the pilot PN code generator 10 for in-phase component (I-channel), to form in-phase component spread data D7, and outputs this to a first multiplier 13 of an offset quadrature phase-shift keying (OQPSK) modulator 12 after restricting its band through a base band filter 11.

In this connection, the pilot PN code generator 10 for I-channel forms the 15th-order pilot PN code based on the formula $P_{I(X)}$ expressed by the following equation (1):

$$P_{I(X)} = X^{15} + X^{13} + X^9 + X^7 + X^5 + 1 \quad (1)$$

Here, the pilot PN code for I-channel is adjusted so that its cycle becomes $2^{15}$ by inserting an additional "0" to the tail of the cycle of the 15th-order M sequence code (more precisely, after "0" continues fourteen times).

The first multiplier 13 outputs modulation data D10 formed by multiplying a carrier wave $S_c$ ($=\cos(\omega t)$) generated at oscillator 14 by the in-phase component spread data D7, to an adder 15.

The third exclusive OR circuit 9, by further applying the spread-spectrum processing to the quadrature component Q using the 15th-order pilot PN code having 1.2288 Mbps, which is supplied from the pilot PN code generator 16 for quadrature components (Q-channel), forms quadrature component spread data D8 and transmits this to a 1/2 PN chip delay circuit 17.

In this connection, the pilot PN code generator 16 for Q-channel forms the 15th-order pilot PN code based on the formula $P_{Q(X)}$ expressed by the following equation (2):

$$P_{Q(X)} = X^{15} + X^{12} + X^{11} + X^{10} + X^6 + X^5 + X^4 + X^3 + 1 \quad (2)$$

Here, the pilot PN code for Q-channel is also adjusted so that its cycle becomes $2^{15}$ by inserting one additional "0" to the tail of the cycle of 15th-order M-sequence code (more precisely, after "0" continues fourteen times).

The 1/2 PN chip delay circuit 17, by 1/2-chip-delaying (approximately 406.9 nsec) the quadrature component spread data D8, forms quadrature component spread data D9 and transmits this to a second multiplier 19 after restricting the band through the base band filter 18. The second multiplier 19 transmits the modulation data D11 formed by multiplying the quadrature component spread data D9 by the carrier wave $S_c'$ ($=\sin(\omega t)$) formed at the oscillator 14, to the adder 15.

The adder 15 obtains modulation data D12 having its maximum phase change of the carrier wave $S_c$ as $\pm\pi/2$ by adding the modulation data D10 and the modulation data D11 and transmits this via a high frequency circuit and an antenna (not shown in Fig.).

Moreover, in the case where the mobile station transmits TC frame through the traffic channel, since a flow of the processing after the interleaver 4 is the same as the flow of the processing in the case of transmitting the AC frame data D1 through the access channel, the processing up to the symbol repeater 3 will be described in the following paragraphs.

The mobile station inputs TC frame data D11 having four kinds of transmission speeds (9.6 Kbps, 4.8 Kbps, 2.4 Kbps and 1.2 Kbps) in the rate set 1 and 4 kinds of transmission speeds (14.4 Kbps, 7.2 Kbps, 3.6 Kbps and 1.8 Kbps) in the rate set 2 into the convolutional encoder 2.

The convolutional encoder 2, by convolutional-encoding the TC frame data D11 of 9.6 Kbps, 4.8 Kbps, 2.4 Kbps and 1.2 Kbps in the rate set 1 based on the preset restriction length (k=9) and coding rate (r=1/3), forms transmission symbol-sequence data D12 of 28.8 Kbps, 14.4 Kbps, 7.2 Kbps and 3.6 Kbps and transmits these to the symbol repeater 3.

Moreover, the convolutional encoder 2, by convolutional-encoding the TC frame data D1 of 14.4 Kbps, 7.2 Kbps, 3.6 Kbps and 1.8 Kbps in the rate set 2 based on the preset restriction length (k=9) and the coding rate (r=1/2), forms transmission symbol sequence data D12 of 28.8 Kbps, 14.4 Kbps, 7.2 Kbps and 3.6 Kbps and transmits these to the symbol repeater 3.

At this point, the reason why the coding rate of the rate set 1 (r=1/3) is different from the coding rate of the rate set 2 (r=1/2) is that the transmission speeds for the final data to be output from the symbol repeater 3 are all standardized to 28.8 Kbps and the processing after the interleaver 4 is conducted in the same manner.

When the transmission symbol sequence data D11 has the transmission speeds of 9.6 kbps and 14.4 Kbps in the rate set 1 and the rate set 2, the symbol repeater 3 does not repeat each symbol of the transmission symbol sequence data D12 of 28.8 Kbps, but transmits the transmission symbol sequence data D12 as it is as the transmission symbol sequence data D13 to the interleaver 4.

Furthermore, when the transmission symbol sequence data D11 has the transmission speeds of 4.8 Kbps and 7.2 Kbps in the rate set 1 and the rate set 2, the symbol repeater 3, by utilizing each symbol of the transmission symbol sequence data D12 of 14.4 Kbps repeatedly once more i.e., the same symbol continues twice), forms transmission symbol sequence data D13 of 28.8 Kbps and transmits this to the interleaver 4.

Moreover, when the transmission symbol sequence data D11 has the transmission speeds of 2.4 Kbps and 3.6 Kbps in the rate set 1 and the rate set 2, the symbol repeater 3, by using each symbol of the transmission symbol sequence data D12 of 7.2 Kbps three times repeatedly (i.e., the same symbol continues 4 times), forms the transmission symbol sequence data D13 of 28.8 Kbps and transmits these to the interleaver 4.

Furthermore, when the transmission symbol sequence data D11 has the transmission speeds of 1.2 Kbps and 1.8 Kbps in the rate set 1 and the rate set 2, the symbol repeater 3 forms transmission symbol sequence data D13 of 28.8 Kbps by using each symbol of transmission symbol sequence data D12 of 3.6 Kbps repeatedly seven times (i.e., the same symbol continues 8 times) and transmits this to the interleaver 4.

In the transmission unit 1, the processing after the interleaver 4 is the same as the case of transmitting the AC frame through the access channel, and the transmission unit 1 finally forms modulation data D12 via the adder 15 and transmits this via a high frequency circuit and an antenna (not shown in Fig.).

By the way, in the mobile station, long code PN code is extracted from the signals received from the base station with the receiving unit (not shown in Fig.), and by trapping the timing (phase) of the long code PN code, the system time synchronized with the absolute reference time used in the base station is obtained.

Accordingly, in the transmission unit 1 the system time described above is controlled by the control circuit 20 using a central processing unit (CPU). And as well as each circuit from the convolutional encoder 2 to the adder 15 is operated by the control unit 20 based on the system time, the reference clock CLK synchronized with the system time, timing information FRM showing the starting point corresponding to the transmission frame per each frame number, and the frame number information FNUM of transmission frame are supplied to the pilot PN code generator for I-channel 10 and the pilot PN code generator for Q-channel 16.

(3) Construction of Pilot PN Code Generator

Figure 7:
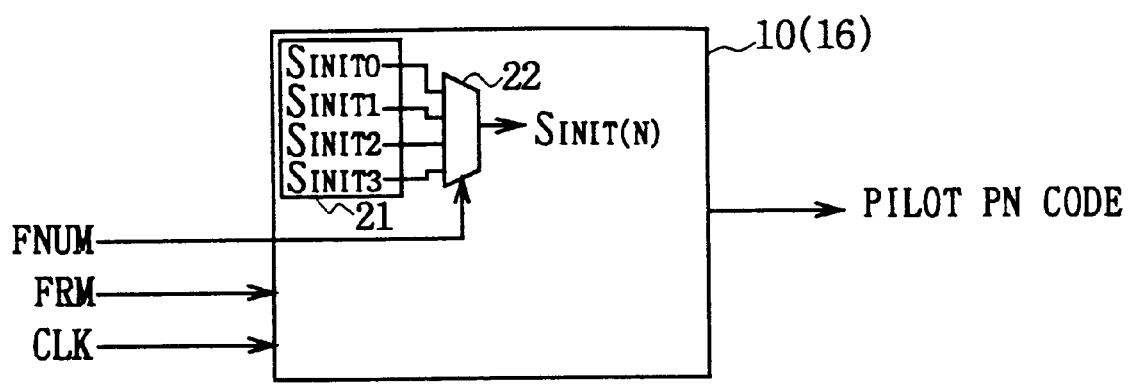
FIG. 7 is a schematic diagram showing the pilot PN code generator according to an embodiment of the present invention.
Figure 8:
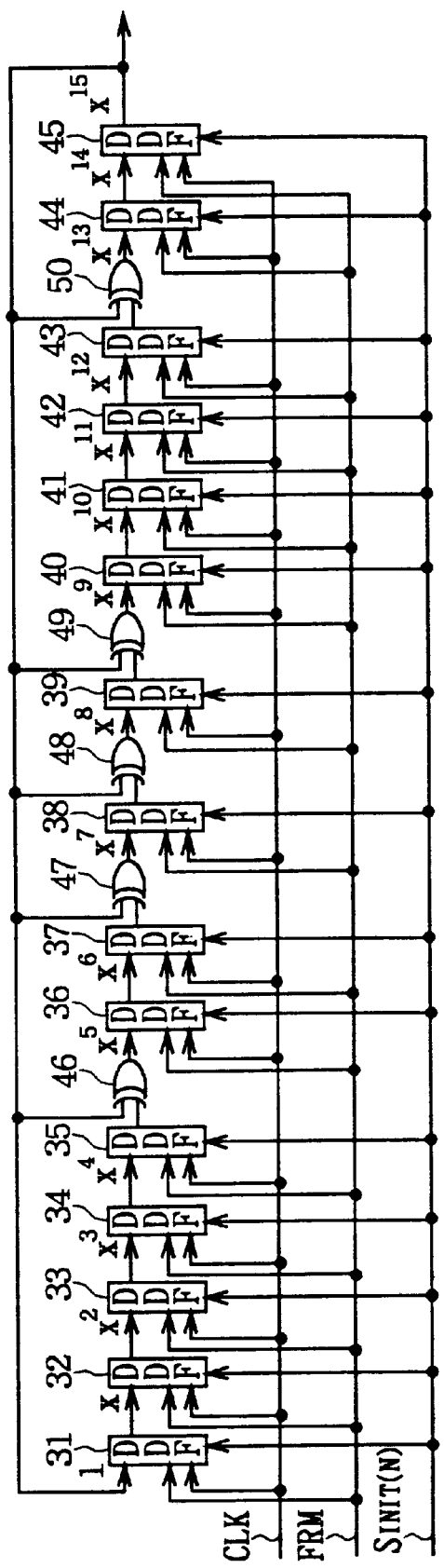
FIG. 8 is a block diagram showing the construction of a pilot PN code generator for I-ch according to an embodiment of the present invention.

As shown in FIG. 7, the pilot PN code generator for I-channel 10 and the pilot PN code generator for Q-channel 16 are generators to generate pilot PN codes formed of 15th-order M-sequence code (maximum length linear shift resister sequence code) and whenever the reference clock CLK is entered, one value of the pilot PN code is output. More specifically, the reference clock CLK synchronized with the system time, which is the absolute reference time, and the cycle of the pilot PN code is synchronized.

Moreover, in the pilot PN code generator for I-channel 10 and the pilot PN code generator for Q-channel 16, four kinds of initial values $S_{INIT0}$ to $S_{INIT3}$ respectively corresponding to the frame number 0 to 3 of the transmission frame are stored in the internal memory 21, and these generators output the initial value $S_{INIT(N)}$ selected corresponding to the frame number information FNUM from the selector 22 and outputs pilot PN codes from the head of code sequence pattern based on the initial value $S_{INIT(N)}$ and the timing information FRM.

In practice, the pilot PN code generator for I-channel 10 is comprised of 15-stages of delay Flip-Flots (DDF) 31 to 45 and exclusive logical sum gates 46 to 50, and inputs timing information FRM and the initial value $S_{INIT(N)}$ corresponding to the frame number information FNUM together with the reference clock CLK to each DDF 31 to 45.

Accordingly, the pilot PN code generator for I-channel 10 initializes the conditions of DDFs 31 to 45 at the timing synchronized with the timing information FRM corresponding to the frame number 0 to 3 of the transmission frame based on the initial value $S_{INIT(N)}$ which is output from the selector 22 based on the frame number information FNUM.

Figure 9:
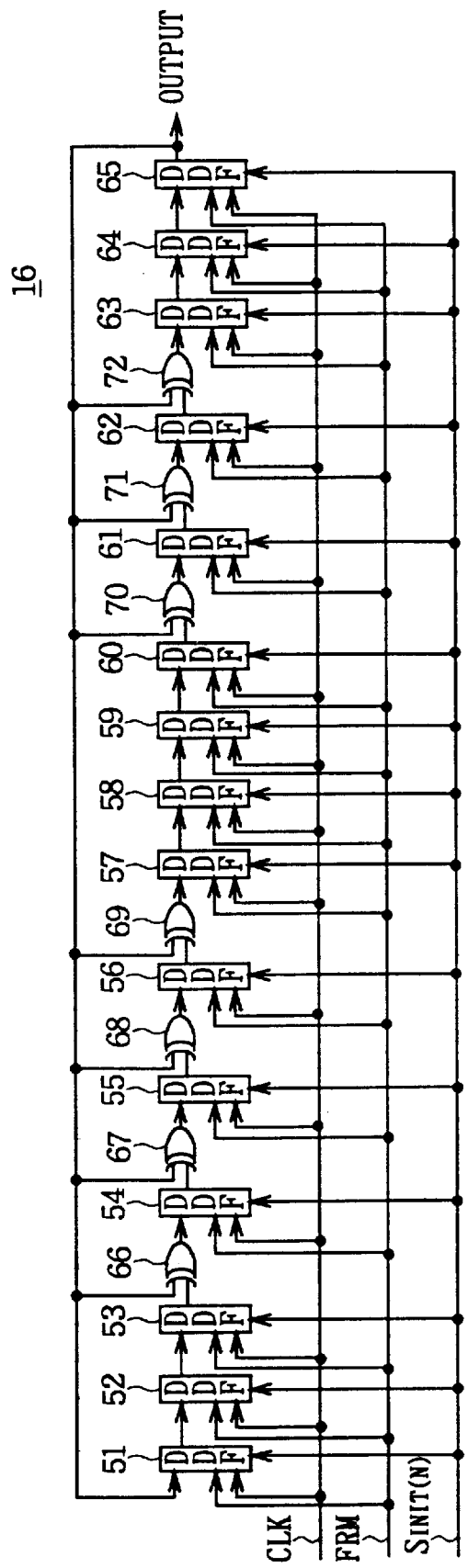
FIG. 9 is a block diagram showing the construction of a pilot PN code generator for Q-ch according to an embodiment of the present invention.

Furthermore, the pilot PN code generator for Q-channel 16 is comprised of 15-stages of delay Flip-Flops (DDF) 51 to 65 and exclusive logical sum gates 66 to 72 as shown in FIG. 9. And it inputs the timing information FRM and the initial value $S_{INIT(N)}$ corresponding to the frame number information FNUM together with the reference clock CLK as in the case of the pilot PN code generator for I-channel 10.

Accordingly, the pilot PN code generator for Q-channel 16 initializes the conditions of DDFs 51 to 65 at the timing synchronized with the timing information FRM corresponding respectively to the frame number 0 to 3 of the transmission frame based on the initial value $S_{INIT(N)}$ which is output from the selector 22 based on the frame number information FNUM.

Figure 10:
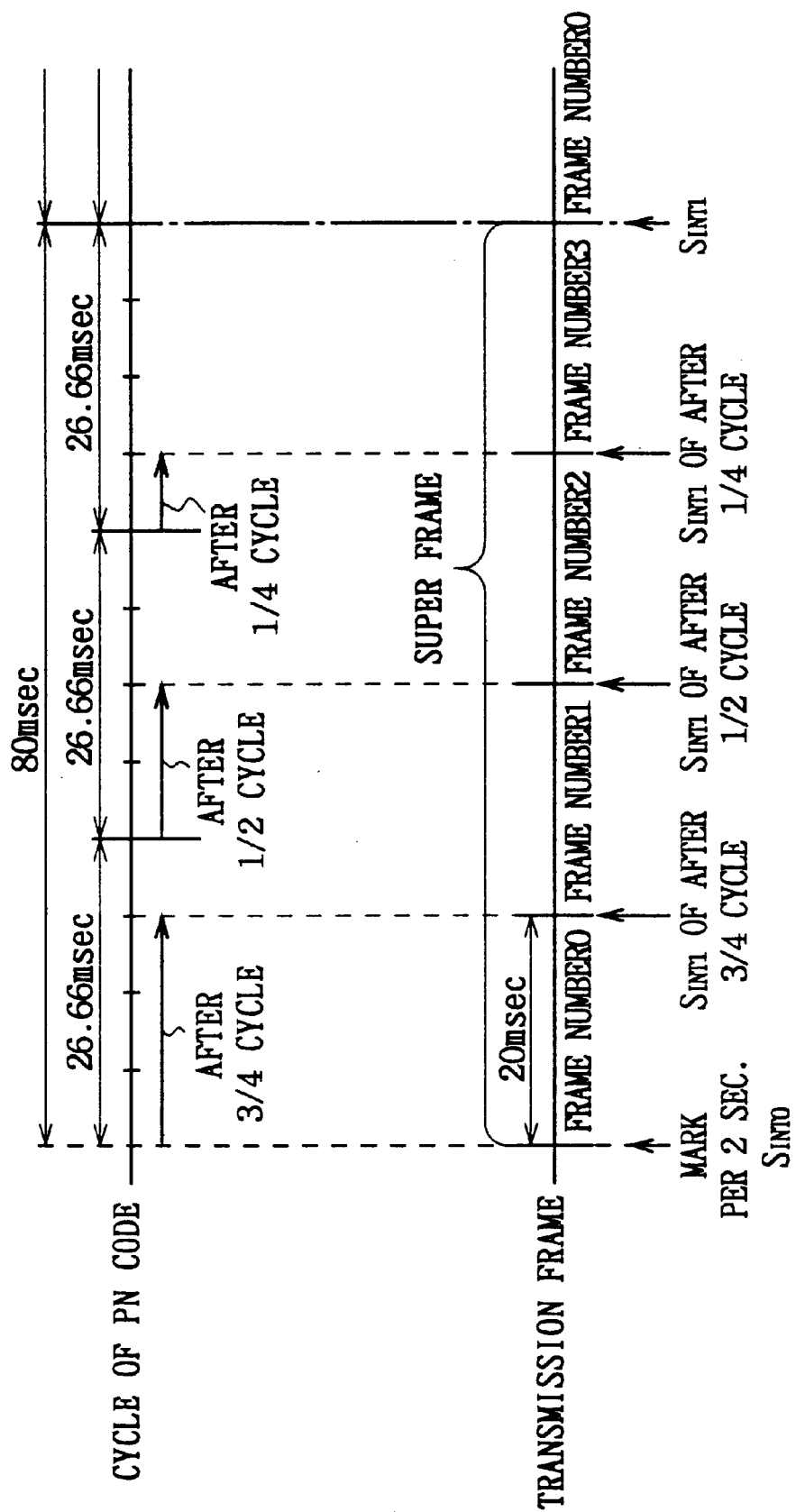
FIG. 10 is a timing chart showing the initialization timing according to an embodiment of the present invention.

At this point, as shown in FIG. 10, the initial value $S_{INIT0}$ memorized in the internal memory 21 is the first initial value which has been used heretofore for the frame number "0", and it is synchronized with the cycle of the super frame. The initial value $S_{INIT1}$ is the second initial value data showing the initialization timing after 3/4 cycle from the time of the initial value $S_{INIT0}$ for the frame number "1".

Moreover, the initial value $S_{INIT2}$ is the third initial value data showing the initialization timing after 1/2 cycle from the starting time of a pilot PH code following the initial value $S_{INIT1}$ for the frame number "2". The initial value $S_{INIT3}$ is the fourth initial value data showing the initialization timing after 1/4 cycle from the starting time of a pilot PN code following the initial value $S_{INIT2}$ for the frame number "3".

Accordingly, the initial value $S_{INIT1}$ agrees with the timing of the start time of the transmission frame with the frame number "1", and the initial value $S_{INIT2}$ agrees with the timing of the start time of the transmission frame with the frame number "2". Furthermore, the initial value $S_{INIT3}$ agrees with the timing of the start time of the transmission frame with the frame number "3".

Thus, since the pilot PN code generator for I-channel 10 and the pilot PN code generator for Q-channel 16 send out initial values $S_{INIT0}$ to $S_{INIT3}$ selected based on the frame number information FNUM by switching the selector 22, the conditions of DDFs 31 to 45 and DDF 51 to 65 can be initialized at the start timing of each transmission frame, not at the timing for each super frame, and the pilot PN code can be generated from the head of the code sequence pattern.

Furthermore, at the time of starting the operation, by outputting initial values $S_{INIT0}$ to $S_{INIT3}$ selected based on the frame number information FNUM by switching the selector 22, the pilot PN code generator for I-channel 10 and the pilot PN code generator for Q-channel 16 initialize the conditions of DDFs 31 to 45 and DDF 51 to 65 at the start timing of the transmission frame, not at the timing for each super frame, and pilot PN code can be generated from the head of the code sequence pattern.

(4) Operation and Effects

According to the foregoing construction, since the pilot PN code generator for I-channel 10 and the pilot PN code generator for Q-channel 16 store four kinds of initial values $S_{INIT0}$ to $S_{INIT3}$ corresponding to the frame number in the internal memory 21 and initialize the conditions of DDFs 31 to 45 and DDFs 51 to 65 based on the initial value $S_{INIT(N)}$ selected based on the frame number information FNUM and the timing information FRM, even in the middle of transmission frame in the frame number 0 to 3 when the predetermined response information should be sent back within the fixed time period after receiving the predetermined receive signal from the base station, the pilot PN code can be generated from the head of code sequence pattern at the start timing of the next transmission frame based on the timing information FRM which shows the nearest timing at this time, and the initial value $S_{INIT(N)}$ selected based on the frame number information FNUM.

With this arrangement, it is no longer necessary for the pilot PN code generator for I-channel 10 and the pilot PN code generator for Q-channel 16 to wait until the start time (intervals of 80 msec) of the next super frame before actually the pilot PN code is generated when the need for initialization occurs. And thus, the waiting time until the pilot PN code is generated from the head of code sequence pattern can be outstandingly shortened, the maximum 80 msec to less than 20 msec.

Accordingly, even in the case where the mobile station receives any control information from the base station and the mobile station should transmit the response information before the predetermined time, the response information can transmitted to the base station by the predetermined time.

According to the foregoing construction, since the pilot PN code generator for I-channel 10 and the pilot PN code generator for Q-channel 16 initialize conditions of DDFs 31 to 45 and DDFs 51 to 65 based on four kinds of initial values $S_{INIT0}$ to $S_{INIT3}$ synchronized with the start timing of the transmission frame, the pilot PN code can be generated at the start timing of the transmission frame from the head of the code sequence pattern.

(5) Other Embodiments

Note that, in the above-mentioned embodiment, the pilot PN codes formed of fifteenth-order M-sequence codes is generated. However, the present invention is not only limited to this but also a pilot PN codes formed of various other pilot PN codes formed of, for example, fourth-order M-sequence codes can be generated.

Moreover, in the above-mentioned embodiment, initialization is performed by newly providing initial values $S_{INIT1}$ to $S_{INIT3}$ based on the cycle of the pilot PN code. However, the present invention is not only limited to this but also only the initial value $S_{INIT2}$ can be provided for initialization.

Furthermore, in the above-mentioned embodiment, the conditions of DDFs 31 to 45 and DDFs 51 to 65 are initialized by using the initial value $S_{INIT1}$ showing the initialization timing after 3/4 cycle, the initial value $S_{INIT2}$ showing the initialization timing after 1/2 cycle and the initial value $S_{INIT3}$ showing the initialization timing after 1/4 cycle on the basis of the cycle of the pilot PN code. However, the present invention is not only limited to this but also initial values $S_{INIT1}$ to $S_{INIT3}$ having various other cycles corresponding to the time per one cycle of the transmission frame (in the case of this embodiment, 20 msec) can be used as long as the initialization can be conducted based on the initial values $S_{INIT1}$ to $S_{INIT3}$ synchronized with the border of the transmission frames.

Furthermore, in the above-mentioned embodiment, the PN code generation circuit is applied to the pilot PN code generator for I-channel 10 and the pilot PN code generator for Q-channel 16. However, the present invention is not only limited to this but also the present invention can be applied to other circuits to generate various other PN codes such as a circuit to generate long code PN codes.

Furthermore, in the above-mentioned embodiment, the pilot PN code generator for I-channel 10 and the pilot PN code generator for Q-channel 16 are composed of the DDFS 31 to 45 and exclusive logical sum gates 46 to 50 (DDFs 51 to 65 and exclusive logical sum gates 66 to 72) as the sequence generator means and the internal memory 21 and the selector 22 as the initialization means. However, the present invention is not limited to this but also the PN code generation circuit can be constructed by the sequence generation means and the initialization means having various other constructions, for example, the initial values $S_{INIT1}$ to $S_{INIT3}$ are taken in from the outside with the initialization means.

Moreover, in the above-mentioned embodiment, the PN code generation circuit according to the present invention is applied to the transmission unit 1 of the mobile station in the CDMA system cellular radio communications system using pilot PN codes. However, the present invention is not only limited to this but can be applied to various other cellular radio communications systems such as a system in which CDMA system and time division multiple access (TDMA) system are combined, as long as those systems use pilot PN codes.

While there has been described in connection with the preferred embodiments of the invention, it will be obvious to those skilled in the art that various changes and modifications may be aimed, therefore. To cover in the appended claims all such changes and modifications as fall within the true spirit and scope of the invention.

What is claimed is:

1. A PN code generation apparatus for generating a pseudo random noise PN code sequence of n cycles (n is an integral number more than one) having a synchronization relation with a transmission frame of m cycles (m is an integral number more than one and is not n), said PN code generation apparatus comprising:

means for receiving identification information and start timing information of a specific frame out of a plurality of transmission frames;

means for generating said PN code sequences wherein said synchronization relation with said transmission frame is started at the start timing of said specific frame;

storage means for storing initial data of the PN code sequence corresponding to each of the start timings of said plurality of transmission frames; and said means for generating said PN code sequence includes a PN code generation circuit for generating said PN code sequence by being supplied with initial data, which is read out from said storage means based on said identification information of said specific frame, and said start timing information.

2. A radio communication apparatus for generating signals subjected to spread spectrum communication by multiplying a pseudo random noise PN code sequence by transmission data, comprising:

control means for controlling timing of a sequential generation of a plurality of transmission frames as transmission data; and PN code generation means for generating a PN code sequence of n cycles (n is an integral number more than one) having synchronization relation with said transmission frame of m cycles (m is an integral number more than one and is not n); wherein upon transmitting a response signal to a received signal, said control means supplies identification information and start timing information of a specific frame out of said plurality of transmission frames to said PN code generation means, and said PN code generation means starts generating said PN code sequence which keeps synchronization relation with said transmission frame at the start timing of said specific frame, in response to said identification information and said start timing information of said specific frame, and wherein said PN code generation means comprises:

storage means for storing initial data of a PN code sequence corresponding to each of the start timings of said plurality of transmission frames; and a PN code sequence generation circuit for generating said PN code sequence by being supplied with initial data, which is read out from said storage means based on said identification information of said specific transmission frame supplied from said control means, and said start timing information supplied from said control means.

3. A PN code generation method for generating a pseudo random noise PN code sequence of n cycles (n is an integral number more than one) having a synchronization relation with said transmission frame of m cycles (m is an integral number more than one and is not n), comprising the steps of:

receiving identification information and start timing information of a specific frame out of a plurality of transmission frames;

generating said PN code sequence keeping said synchronization relation with said transmission frame starting at the start timing of said specific frame;

storing initial data of a PN code sequence corresponding to the start timings of each of said plurality of transmission frames; and generating said PN code sequence in accordance with said initial data, which is read out from said storage means based on said identification information of said specific transmission frame, and said start timing information.

\* \* \* \* \*